(12) United States Patent
Topper

(10) Patent No.: US 7,889,925 B2
(45) Date of Patent: Feb. 15, 2011

(54) METHOD, SYSTEM AND COMPUTER PROGRAM FOR ENCODING AND DECODING A PIXELIZED TARGET GRAPHIC SYMBOL

(76) Inventor: Aharon Elhanan Topper, 11/8 Hama'apilim Street, Jerusalem 92545 (IL)

( * ) Notice: Subject to any disclaimer, the term of this patent is extended or adjusted under 35 U.S.C. 154(b) by 1092 days.

(21) Appl. No.: 11/612,493

(22) Filed: Dec. 19, 2006

(65) Prior Publication Data
US 2007/0140567 A1 Jun. 21, 2007

(30) Foreign Application Priority Data
Dec. 19, 2005 (IL) .................................. 172678

(51) Int. Cl.
*G06K 9/00* (2006.01)
*G06K 9/36* (2006.01)
(52) U.S. Cl. ..................... 382/181; 382/232; 358/2.1
(58) Field of Classification Search ......... 382/181–253; 358/2.1, 3.11
See application file for complete search history.

(56) References Cited

U.S. PATENT DOCUMENTS

| | | | | |
|---|---|---|---|---|
| 4,829,568 A * | 5/1989 | Clark et al. | ................. | 382/182 |
| 4,831,657 A * | 5/1989 | Casey et al. | ................. | 382/228 |
| 5,396,564 A | 3/1995 | Fitzpatrick | | |
| 5,875,261 A * | 2/1999 | Fitzpatrick et al. | ......... | 382/165 |
| 6,460,766 B1 * | 10/2002 | Olschafskie et al. | ........ | 235/454 |
| 6,996,280 B1 * | 2/2006 | Matsukawa et al. | ......... | 382/236 |

* cited by examiner

*Primary Examiner*—Manav Seth

(57) ABSTRACT

Method, system and computer program product for encoding a pixelized target graphic symbol by obtaining an encoded pixel cluster that is encoded with a code that is characteristic of the target graphic symbol and pixelizing the target graphic symbol using at least one encoded pixel cluster. A document having printed thereon such optically readable target graphic symbols is decoded by optically scanning or photographing the document at sufficiently high resolution to obtain a pixel array all of whose pixels are discretely identifiable. The pixel array is processed so as to identify discrete graphic symbols each comprising one or more respective pixel clusters, at least one which in each discrete graphic symbol is identified and decoded so as to determine an identity of the discrete graphic symbol associated therewith.

11 Claims, 6 Drawing Sheets

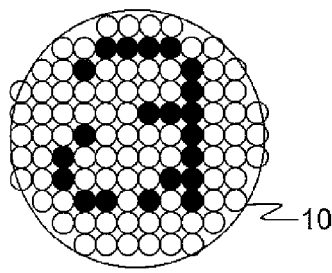
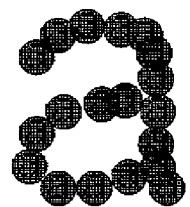
FIG. 1a  FIG. 1b  FIG. 1c
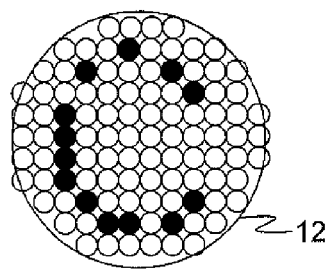
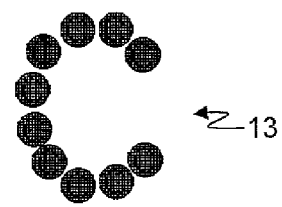
FIG. 2a  FIG. 2b  FIG. 2c
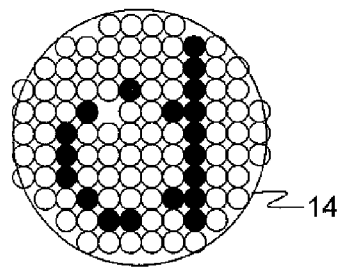
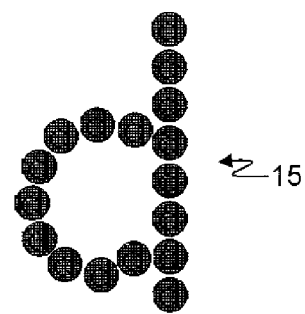
FIG. 3a  FIG. 3b  FIG. 3c

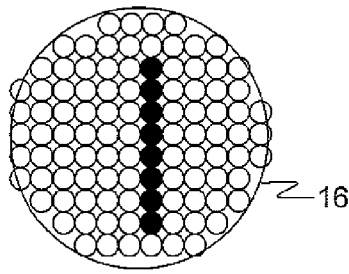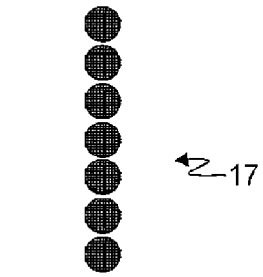
FIG. 4a　　　　　FIG. 4b　　　　　FIG. 4c
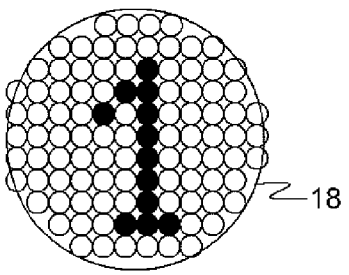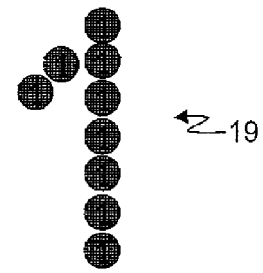
FIG. 5a　　　　　FIG. 5b　　　　　FIG. 5c
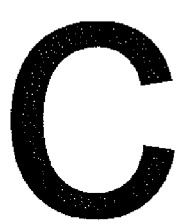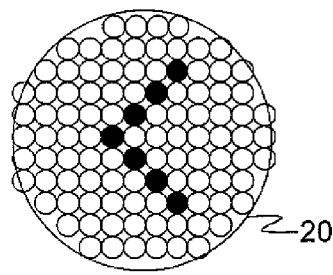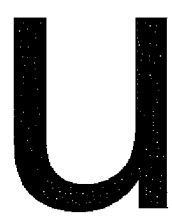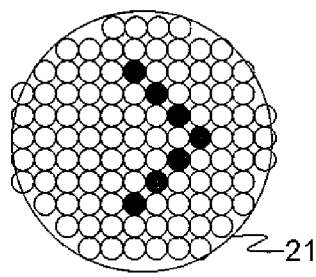
FIG. 6a　　FIG. 6b　　FIG. 7a　　FIG. 7b

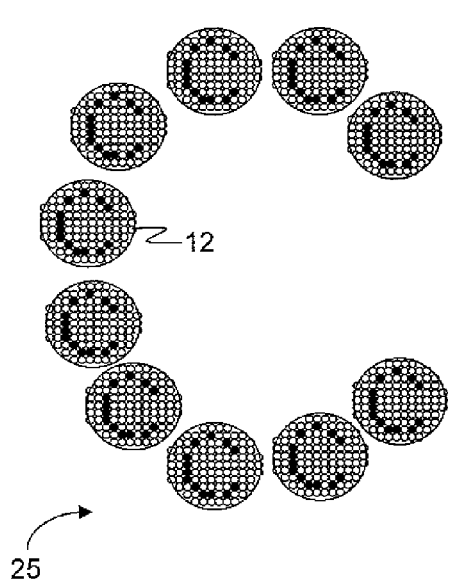
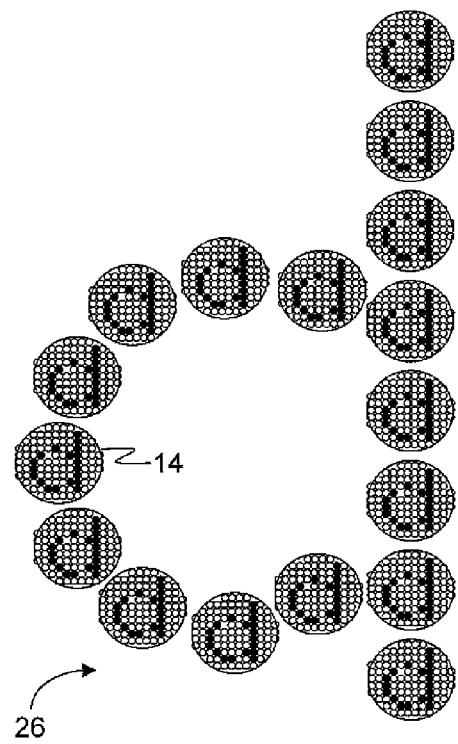
FIG. 8a
FIG. 8b
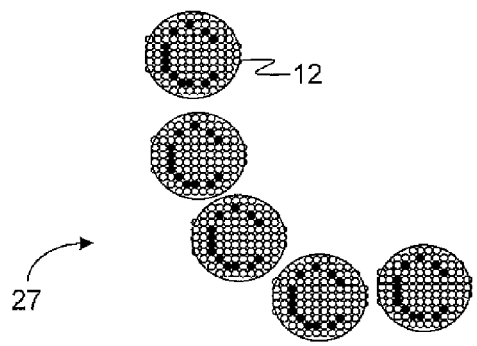
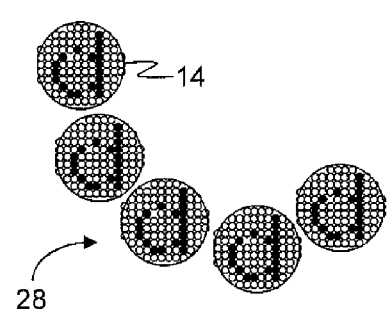
FIG. 9a
FIG. 9b

FIG. 10
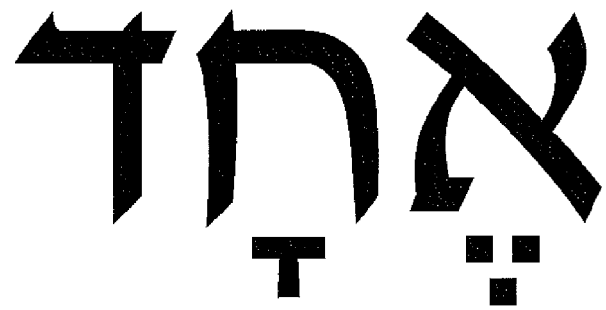
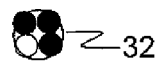
FIG. 11a  FIG. 11b  FIG. 11c  FIG. 11d
FIG. 12a  FIG. 12b  FIG. 12c  FIG. 12d
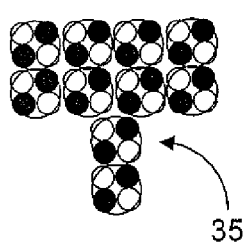
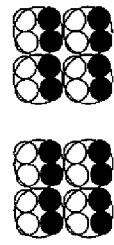
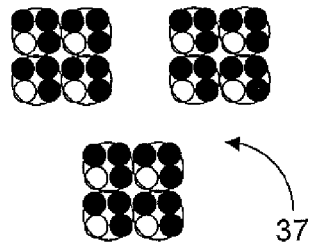
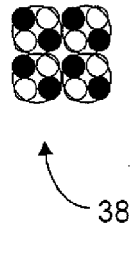
FIG. 13a  FIG. 13b  FIG. 13c  FIG. 13d

METHOD, SYSTEM AND COMPUTER PROGRAM FOR ENCODING AND DECODING A PIXELIZED TARGET GRAPHIC SYMBOL

FIELD OF THE INVENTION

This invention relates to pixelization of graphic symbols.

BACKGROUND OF THE INVENTION

In the digital graphic arts, graphic objects are formed by pixels that are juxtaposed in close formation and at sufficient resolution so as to give the effect to the observer of continuous, smooth graphics. This is true regarding the formation of graphic symbols for display on a computer screen as well as for printing and plotting using suitable output devices. In all cases, symbols appear smooth but are actually constituted by multiple pixels. The more pixels that are used per unit area, the finer is the resolution of the resulting image and the more difficult it is to observe discontinuities between adjacent pixels. But the discontinuities are present all the same.

Normally, pixels are considered to be the smallest printable unit that forms the lowest common factor of all graphic symbols and effectively is constituted by a dot that may be displayed, printed or plotted. Since all dots forming a graphic symbol are identical as are the dots in different graphic symbols, known printing and display devices do not differentiate between pixels that are used to form different graphic symbols.

A hard copy of a graphic image comprising one or more graphics symbols may be scanned so as to form a digitized image that may be stored and processed digitally using a computer. When the graphic image contains text, it may further be required not simply to store the text graphically but to convert alphabetic characters to computer characters that may then be word-processed. This is done using Optical Character Recognition (OCR) software, which, put simply, recognizes different letters of the printed alphabet and converts text, letter by letter, to the appropriate character in the ASCII table.

This works well when text is clean and free of stains and other foreign markings that are indistinguishable to the OCR software and so give rise to errors in conversion. But when text is faded or damaged it is very more difficult if not impossible to convert printed text to computer-editable format using known OCR techniques; and it is frequently difficult if not impossible to identify a printed character that is damaged or partially missing.

U.S. Pat. No. 5,396,564 (Fitzpatrick et al.) issued Mar. 7, 1995 discloses a method of, and apparatus for, processing a color coded character to recognize the character being examined by an OCR device. The color coded character comprises a predominate color associated with said character distinguishable by humans, and a non-predominate color associated with the character and non-distracting to humans, but distinguishable by a color scanner. This allows the non-predominate color of a character to be used as the sole criteria for recognizing the character. Thus, for example, "a" may be printed red, "b" may be printed blue, and "c" may be printed yellow. It is stated that color coding OCR eliminates the data storage and computer processing requirements of geometric OCR by eliminating shape processing. However, it requires that the OCR software know in advance the coding scheme being employed.

It would clearly be an advantage if graphic symbols were encoded in such a manner as to allow accurate decoding for example by OCR software even when the printed symbols are only partially legible and without the need for the OCR software to know in advance the coding scheme being employed.

SUMMARY OF THE INVENTION

It is an object of the invention to encode graphic symbols particularly, albeit not only, keyboard printable characters such as alphanumeric characters and other printable graphic symbols, so as to allow accurate decoding even when the printed symbols are only partially legible.

This object is realized in accordance with a first aspect of the invention by a method for encoding a pixelized target graphic symbol, the method comprising:

(a) obtaining an encoded pixel cluster comprising a group of pixels configured to form a source graphic symbol at least part of which is geometrically similar to an identifiable feature of the target graphic symbol; and (b) pixelizing the target graphic symbol using at least one of said encoded pixel cluster.

According to a second aspect of the invention, there is provided a data carrier bearing data representative of an optically readable target graphic symbol that comprises at least one encoded pixel cluster comprising a group of pixels configured to form a source graphic symbol at least part of which is geometrically similar to an identifiable feature of the target graphic symbol. Such a data carrier may be a computer readable medium such as a disk or other memory device. Alternatively, it can be a printed document.

According to a third aspect of the invention, there is provided a method for processing a printed document containing computer readable target graphic symbols for identifying target graphic symbols therein, the method comprising:

(a) obtaining a pixel array formed by optically scanning or photographing said document at sufficiently high resolution that all pixels thereof are discretely identifiable;

(b) processing the pixel array so as to identify discrete graphic symbols each comprising one or more respective pixel clusters;

(c) identifying at least one pixel cluster in each discrete graphic symbol; and (d) decoding the at least one pixel cluster for each discrete graphic symbol so as to determine an identity of the discrete graphic symbol associated therewith.

According to a fourth aspect of the invention, there is provided an encoder for encoding a pixelized graphic symbol, the encoder comprising:

a pixel cluster extraction unit for obtaining an encoded pixel cluster that is encoded with a code that is characteristic of the graphic symbol, and a symbol construction unit coupled to the pixel cluster extraction unit for pixelizing the graphic symbol using the encoded pixel cluster According to a fifth aspect of the invention, there is provided an decoder for decoding a pixelized graphic symbol, the decoder comprising:

an graphic symbol processor for processing a pixel array so as to identify a set of graphic symbols, and a pixel processor coupled to the graphic symbol processor for processing each graphic symbol in said set and identifying at least one pixel cluster that is encoded with a code that is characteristic of the graphic symbol.

BRIEF DESCRIPTION OF THE DRAWINGS

In order to understand the invention and to see how it may be carried out in practice, some embodiments will now be described, by way of non-limiting example only, with reference to the accompanying drawings, in which:

FIGS. 1a, 1b and 1c show respectively the alphabetic symbol "a", a pixel cluster according to a first embodiment of the invention for constructing the symbol "a" and the alphabetic symbol "a" constructed using pixel clusters according to the invention;

FIGS. 2a, 2b and 2c show corresponding symbols for the alphabetic symbol "c";

FIGS. 3a, 3b and 3c show corresponding symbols for the alphabetic symbol "d";

FIGS. 4a, 4b and 4c show corresponding symbols for the alphabetic symbol "l";

FIGS. 5a, 5b and 5c show corresponding symbols for the numeric symbol "1";

FIGS. 6a, 6b and 7a and 7b show respectively corresponding pixels clusters for constructing alphabetic symbols according to a second embodiment of the invention;

FIGS. 8a and 8b show respectively the alphabetic symbols "c" and "d" formed using pixel clusters as illustrated in FIGS. 2b and 3b;

FIGS. 9a and 9b show respectively visually similar partial segments of the alphabetic symbols "c" and "d" shown in FIGS. 8a and 8b;

FIG. 10 shows a Hebrew word containing diacriticals;

FIGS. 11a to 11d show use of pixel clusters for encoding diacriticals such as shown in FIG. 10 according to a third embodiment of the invention;

FIGS. 12a to 12d show the diacriticals illustrated in FIG. 10;

FIGS. 13a to 13d show the diacriticals illustrated respectively in FIGS. 12a to 12d each constructed using the respective pixel cluster shown in FIGS. 11a to 11d;

DETAILED DESCRIPTION OF EMBODIMENTS

Figure 14:
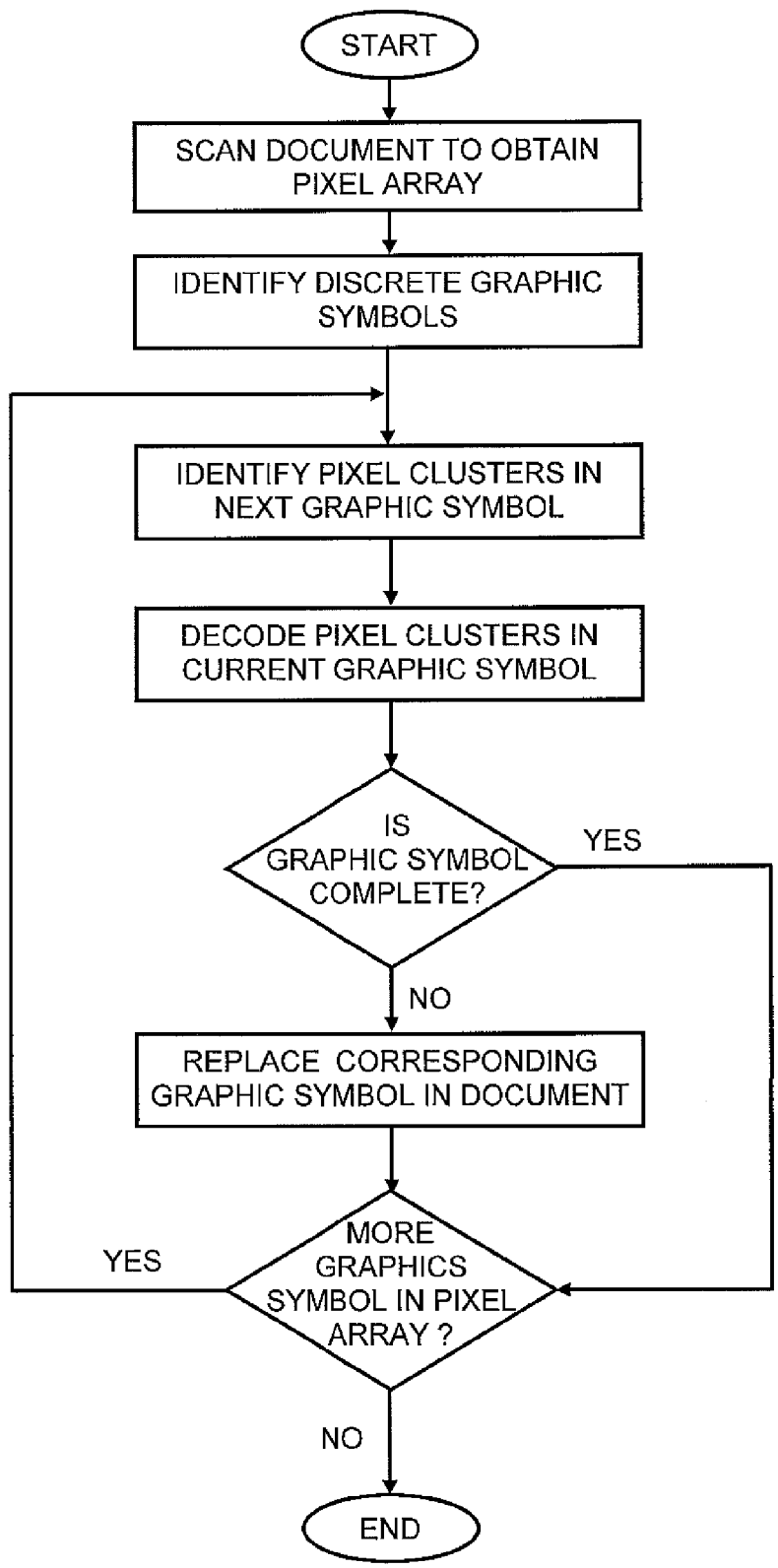
FIG. 14 is a flow diagram showing the principal operations carried out by a method according to an embodiment of the invention for optical character recognition of symbols constructed using pixel clusters according to the invention.

FIG. 1a shows the alphabetic symbol "a" which constitutes a target graphic symbol. FIG. 1b is a pictorial representation of a pixel cluster 10 according to a first embodiment of the invention for constructing the target graphic symbol "a". The pixel cluster 10 comprises a plurality of pixels configured to form a source graphic symbol constituting a code that is characteristic of the target graphic symbol. It is seen that the pixel cluster 10 bears a pictorial resemblance to the target graphic symbol, and in fact is substantially identical thereto, although as explained below with particular reference to FIGS. 6b, 7b and 11a to 11d this is not necessary and other ways to encode the pixel cluster are feasible. FIG. 1c shows a target graphic symbol 11 constructed using the pixel clusters 10. Although all the pixels in the target graphic symbol 11 shown in FIG. 1c are associated with respective pixel clusters 10, this also is not a prerequisite and the invention contemplates the encoding of target graphic symbols so that not all its constituent pixels are associated with pixel clusters according to the invention.

FIG. 2b shows pictorially a pixel cluster 12 configured to form a target graphic symbol 13 shown pictorially in FIG. 2c of the alphabetic character "c" and shown typographically in FIG. 2a. FIG. 3b shows pictorially a pixel cluster 14 configured to form a target graphic symbol 15 shown pictorially in FIG. 3c of the alphabetic character "d" and shown typographically in FIG. 3a. FIG. 4b shows pictorially a pixel cluster 16 configured to form a target graphic symbol 17 shown pictorially in FIG. 4c of the alphabetic character "l" and shown typographically in FIG. 4a. FIG. 5b shows pictorially a pixel cluster 18 configured to form a target graphic symbol 19 shown pictorially in FIG. 5c of the numeric character "1" and shown typographically in FIG. 5a.

The symbols shown in FIGS. 1a, 2a, 3a, 4a and 5a are printed using Arial font. It is seen that the alphabetic character "l" (lower case "L") and the numeric character "1" appear distinct since the number "1" has a serif while the alphabetic character "l" is sans serif. However, when printed using other fonts such as Times Roman, there is no clear distinction between the two symbols. This gives rise to an inherent ambiguity when printed documents are scanned and converted to text files using OCR software.

FIG. 6a shows again the alphabetic character "c" that is encoded according to a second embodiment of the invention using pixel clusters 20 shown in FIG. 6b. It is seen that the pixel cluster 20 comprises a plurality of pixels configured to form a source graphic symbol "<" constituting a code that is characteristic of the target graphic symbol. In this case, the source graphic symbol "<" bears a pictorial resemblance to the target graphic symbol although it is certainly visually distinct therefrom. Although in this example, the source graphic symbol bears a pictorial resemblance to the target graphic symbol, it should be understood that this is not required; and various examples are described below with reference to FIGS. 10 to 13 where constituent pixels of a graphic symbol are encoded in a manner that bears no obvious pictorial resemblance to the graphic symbol.

FIGS. 7a and 7b show respectively the target graphic symbol "u" and a corresponding pixels cluster 21 comprising a plurality of pixels configured to form a source graphic symbol ">" constituting a code that is characteristic of the target graphic symbol. The source graphic symbol ">" is not only visually distinct from the target graphic symbol but in this case it bears no pictorial resemblance thereto.

FIG. 8a shows pictorially a target graphic symbol 25 corresponding to the alphabetic symbol "c" formed using the pixel clusters 12 described above with reference to FIG. 2b. Likewise, FIG. 8b shows pictorially a target graphic symbol 26 corresponding to the alphabetic symbol "d" formed using the pixel clusters 14 described above with reference to FIG. 3b.

FIGS. 9a and 9c show visually similar partial segments 27 and 28 of the target graphic symbols 25 and 26, respectively shown in FIGS. 8a and 8b. In practice, the partial segments 27 and 28 may be obtained by optically scanning a document where the alphabetic characters "c" and "d" are only partially legible. Although, the segments are substantially identical in appearance and so could feasibly belong to either "c" or "d", their respective constituent pixel clusters 12 and 14 are distinctive and therefore identification of the constituent pixel clusters 12 and 14 allows unambiguous of the target graphic symbols.

The invention has so far been described with regard to alphanumeric characters. However, it is not limited to alphanumeric characters. For example, many languages employ accent or vowel signs that are printed above or below script and are known in the printing trade as diacriticals. When scanning printed text containing diacriticals, it can be very difficult to distinguish between different diacriticals. Although various examples will now be described with particular reference to the Hebrew alphabet, it is to be understood that these are by way of example only and similar principles may be applied to other languages. For example, they are equally well suited to punctuation in Latin scripts. Likewise, as will be explained below, they can be applied for non-unique encoding of other alphabetic symbols, which allows for groups of matching symbols to be identified, albeit not for unambiguous decoding of a unique symbol for which context-sensitive analysis may then be applied.

FIG. 10 shows a Hebrew word containing diacriticals kamatz (▼), and segol (∵), that can be difficult to distinguish when printed in small typset. Other pairs of diacriticals that may be likewise difficult to distinguish are tsere (••) and patach (−).

FIGS. 11a to 11d show pictorially respective pixel clusters 30 to 33 that may be used to construct diacriticals such as shown in FIG. 10 and that are encoded according to a third embodiment of the invention. Thus, the pixel clusters 30 to 33 all contain four pixels, which are binary encoded so as to encode a respective diacritical. Of specific interest are the pixel cluster 30 shown in FIG. 11a and the pixel cluster 32 shown in FIG. 11c, which are used to encode the kamatz 35 shown pictorially in FIG. 13a and the segol 37 shown pictorially in FIG. 13c. when these graphic symbols are scanned and processed according to the invention, even if they appear insufficiently distinct, their constituent pixel clusters allow unambiguous identification.

FIG. 14 is a flow diagram showing the principal operations carried out by a method according to an embodiment of the invention for optical character recognition of symbols constructed using pixel clusters according to the invention. A document containing graphic symbols configured according to the invention is scanned and processed to obtain a pixel array at sufficiently high resolution that all pixels thereof are discretely identifiable. The pixel array is processed so as to identify discrete graphic symbols each comprising one or more respective pixel clusters. The manner in which this is done is well known to currently-known OCR software. But for the sake of completeness one way is to cluster all pixels that are contained within an empty pixelless border. This may be facilitated by determining inter-line spacing in the document which is easily determined and may then be used as a guide for establishing the upper and lower margins of each graphic symbol.

Another approach is to exploit the fact that graphic symbols generally contain a plurality of identical pixel clusters, thus allowing a repetitive pattern of pixels defining a pixel cluster to be associated with a common graphic symbol.

Having isolated all graphic symbols within the pixel array, the pixel clusters associated with each graphic symbol are identified and decoded. Although typically each graphic symbol is formed from multiple pixel clusters as shown in FIGS. 1c, 2c, 3c and so on, in fact the invention requires that at the minimum there can be identified a single encoded pixel cluster that can be decoded to reveal the identity of the associated graphic symbol. Including only a single encoded pixel cluster in a graphic symbol introduces the risk that if such a pixel cluster is illegible for any reason, it may then not be possible to decode the pixel cluster. However, the cumulative probability that a pixel cluster is illegible and that the associated graphic symbol is also indeterminate is less than the probability of a pixel cluster being illegible. So use of only a single pixel cluster may be statistically tolerable, particularly when encoding ASCII characters and specifically alphanumeric symbols where it may be possible to resolve ambiguities using context-sensitive software. Having identified at least one pixel cluster in each discrete graphic symbol, the pixel cluster is then decoded so as to determine an identity of the discrete graphic symbol associated therewith.

Optionally, it is possible to replace pixels in the pixel array representative of an incomplete graphic symbol by respective pixels of a pixel cluster corresponding to the incomplete graphic symbol. This requires access to a look-up table of corresponding pixel arrays for each graphic symbol. On determining that a symbol is incomplete, such as the alphabetic symbols "c" and "d" shown in FIGS. 9a and 9b, respectively, all pixels associated with the graphic symbol are replaced by those in the corresponding pixel array, which is extracted from the look-up table.

Figure 15:
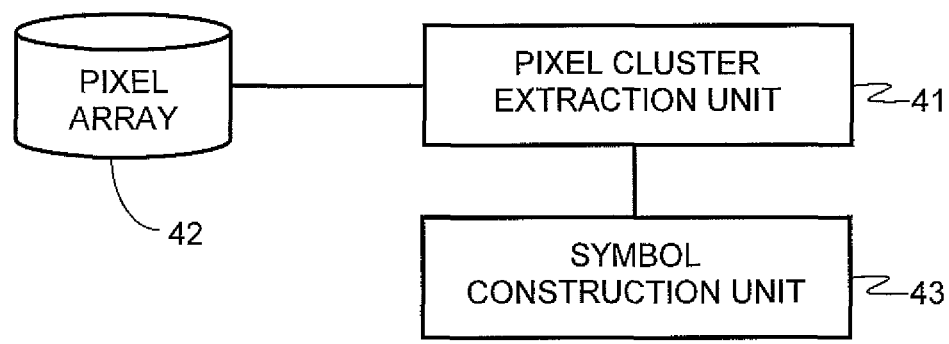
FIGS. 15 and 16 are block diagrams showing the functionality of an encoder and a decoder according to various embodiments of the invention.

FIG. 15 is a block diagram showing the functionality of an encoder 40 according to an embodiment of the invention. The encoder 40 comprises a pixel cluster extraction unit 41 for obtaining from a pixel array 42 an encoded pixel cluster that is encoded with a code that is characteristic of the graphic symbol. A symbol construction unit 43 is coupled to the pixel cluster extraction unit 41 for pixelizing the graphic symbol using the encoded pixel cluster.

Figure 16:
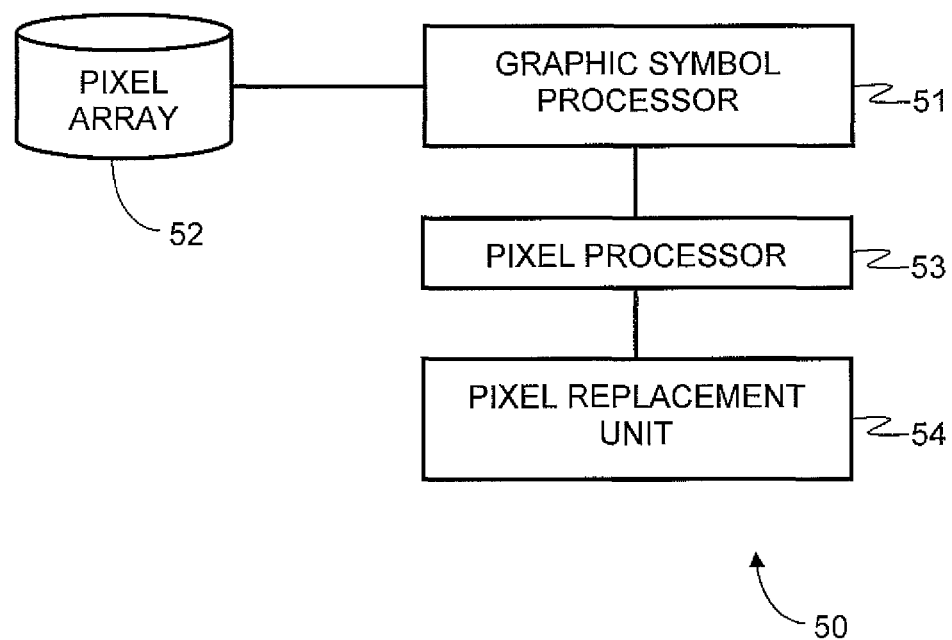

FIG. 16 is a block diagram showing the functionality of a decoder 50 according to an embodiment of the invention. The decoder 50 comprises a graphic symbol processor 51 for processing a pixel array 52 so as to identify a set of graphic symbols, and a pixel processor 53 coupled to the graphic symbol processor 51 for processing each graphic symbol in the set of graphic symbols and identifying at least one pixel cluster that is encoded with a code that is characteristic of the graphic symbol. Optionally, a pixel replacement unit 54 may be coupled to the pixel processor 53 for replacing pixels in the pixel array representative of an incomplete graphic symbol by respective pixels of a pixel cluster corresponding to the incomplete graphic symbol.

The invention also includes within its scope a computer readable target graphic symbol that comprises at least one encoded pixel cluster that is encoded with a code that is characteristic of the target graphic symbol and may be uniquely characteristic thereof. The encoded pixel cluster in such a target graphic symbol may comprise a group of pixels configured to form a source graphic symbol, which may or may not be pictorially similar to the target graphic symbol.

The invention also includes with its scope a printed document having printed thereon target graphic symbols that are encoded using pixel clusters as described. For the purpose of realizing the invention it is necessary that such a document be printed at sufficient resolution that the pixels in the pixel clusters can be identified, so as to allow reconstruction of the associated pixel clusters. It is clear that encoding graphic symbols using pixel clusters according to the invention results in lower resolution than is achieved when printing symbols that are not so encoded. The lower resolution is caused by the need to associate with a single cluster, multiple pixels some of which are empty. It is clear from FIGS. 1b, 2c and 3b, for example, that most of the pixel clusters are in fact empty but it should be borne in mind that no special effort was made to optimize the pixel clusters shown in these figures, which are intended only to demonstrate the principle of the invention. However, even using these far from optimal pixel clusters to form the word "cad" produced the result cad that, while not ideal, is certainly legible even when printed at 300 dpi (dots per inch). At higher scanner and printer resolutions, the results will clearly be improved and therefore more amenable to use of pixel clusters to form the graphic symbols according to the invention.

Although the invention has been described with particular regard to target graphic symbols that are formed of pixel clusters that are unique to the respective target graphic symbol, as noted above the invention also contemplates situations where the pixel clusters are not uniquely characteristic of target graphic symbol in the symbol set. For example, in a given symbol set the pixel cluster 20 encoded with the source graphic symbol ">" shown in FIG. 6*b* could be used to encode both the graphic symbol "c" as well as the closing parenthesis ")". Context sensitive optical character recognition software that identifies a graphic symbol containing the pixel cluster 20 may determine whether the designated symbol is a "c" or a ")" according to predetermined rules that are not a feature of the invention. For example, if no opening parenthesis (i.e. "(") has been detected or if the next symbol is not a space or a punctuation symbol, then the symbol may default to a "c"; or spell check software that is known per se may be employed to check whether the word containing "c" is a valid word, and so on.

In similar manner, the dot represented by the pixel cluster 33 shown in FIG. 11*d* may serve to encode different diacriticals such as hiriq which appears underneath a word such as לִבִּי (my heart); or as holam appearing toward the top of a word as in עוֹלָם (world); or in the middle of a letter as in דִּבֵּר (he spoke). Context sensitive OCR software that is sensitive to the location in the letter of the diacritical can easily determine which of these three diacriticals is required. Indeed, the same diacritical might conceivably be used to form the vowel tsere (••) appearing under the second root letter of the above-mentioned word דִּבֵּר (he spoke) since the rules of Hebrew grammar permit the juxtaposition of two dots to be construed unambiguously as tsere in what is known as the piel conjugation.

It will be appreciated tat when encoding is performed using the approach of FIGS. 1 to 4, much of the resulting target symbol is blank. There will doubtless be occasions where the primary concern is to print text at as high an image resolution as possible. In this case such an approach will not be acceptable and other encoding schemes may be employed that allow unambiguous coding of each symbol in the character set using a smaller number of pixels in each pixel cluster. Alternatively, as noted above, non-unique encoding followed by context sensitive optical character recognition software may be used, thereby offering a compromise between sufficiently high resolution and the advantages of character recognition afforded by the invention. Yet another possibility, which may become feasible as the pixel resolution of optical scanners increases, is to scan at a higher pixel resolution than that of the printed page. This will allow pixel clusters of printed characters formed of sparse clusters that appear 'filled' on the printed page nevertheless to be identified by a very high resolution scanner.

It will also be appreciated that while the examples given relate mainly to the encoding of symbols in the ASCII character set, this is not required and the principles of the invention are equally applicable for encoding any graphic symbol formed of pixels.

It will also be understood that the system according to the invention may be a suitably programmed computer. Likewise, the invention contemplates a computer program being readable by a computer for executing the method of the invention. The invention farther contemplates a machine-readable memory tangibly embodying a program of instructions executable by the machine for executing the method of the invention.

The invention claimed is:

1. A computer-implemented method for encoding a pixelized target graphic symbol, the method comprising:
    (a) obtaining computer-readable data that is representative of an encoded pixel cluster comprising a group of pixels configured to form a source graphic symbol at least part of which is geometrically similar to an identifiable feature of the target graphic symbol; and
    (b) pixelizing the target graphic symbol using at least one of said encoded pixel cluster.

2. The method according to claim 1, wherein the encoded pixel cluster is uniquely characteristic of the target graphic symbol.

3. The method according to claim 1, wherein the encoded pixel cluster is used to form multiple pixels in the target graphic symbol.

4. The method according to claim 1, including printing the target graphic symbol.

5. A computer readable medium bearing data representative of an optically readable target graphic symbol that comprises at least one encoded pixel cluster comprising a group of pixels configured to form a source graphic symbol at least part of which is geometrically similar to an identifiable feature of the target graphic symbol.

6. The computer readable medium according to claim 5, wherein the at least one encoded pixel cluster is uniquely characteristic of the target graphic symbol.

7. The computer readable medium according to claim 5, wherein the encoded pixel cluster is used to form multiple pixels in the target graphic symbol.

8. A computer-implemented method for decoding a printed document having printed thereon optically readable target graphic symbols each comprising a group of pixels configured to form a source graphic symbol at least part of which is geometrically similar to an identifiable feature of the target graphic symbol, the method comprising:
    (a) obtaining computer-readable data that is representative of a pixel array formed by optically scanning or photographing said document at sufficiently high resolution that all pixels thereof are discretely identifiable;
    (b) processing said data using a computer so as to:
        (i) identify discrete graphic symbols each comprising one or more respective pixel clusters;
        (ii) identify at least one pixel cluster in each discrete graphic symbol; and
        (iii) decocde the at least one pixel cluster for each discrete graphic symbol so as to determine an identity of the discrete graphic symbol associated therewith.

9. The method according to claim 8, wherein identifying at least one pixel cluster in each discrete graphic symbol comprises identifying a repetitive pattern of pixels each associated with a common graphic symbol.

10. The method according to claim 8, wherein decoding the at least one pixel cluster for each discrete graphic symbol includes:
    i) determining a set of graphic symbols that map to said pixel cluster; and
    ii) determining a unique identity of the target graphic symbol according to a context in which the target graphic symbol appears.

11. The method according to claim 8, further including:
    (e) replacing pixels in the pixel array representative of an incomplete graphic symbol by respective pixels of a pixel cluster corresponding to the incomplete graphic symbol.

\* \* \* \* \*